United States Patent
Sato

(10) Patent No.: US 10,891,464 B2
(45) Date of Patent: Jan. 12, 2021

(54) IMAGE PROCESSING APPARATUS, IMAGE PROCESSING METHOD, AND RECORDING MEDIUM

(71) Applicant: CASIO COMPUTER CO., LTD., Tokyo (JP)

(72) Inventor: Takeshi Sato, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 61 days.

(21) Appl. No.: 16/153,221

(22) Filed: Oct. 5, 2018

(65) Prior Publication Data

US 2019/0108386 A1 Apr. 11, 2019

(30) Foreign Application Priority Data

Oct. 5, 2017 (JP) ................. 2017-195426

(51) Int. Cl.
| | | |
|---|---|---|
| *G06K 9/00* | (2006.01) | |
| *G06T 7/11* | (2017.01) | |
| *G06T 7/194* | (2017.01) | |
| *G06K 9/32* | (2006.01) | |
| *G06T 7/507* | (2017.01) | |

(52) U.S. Cl.
CPC ....... *G06K 9/00248* (2013.01); *G06K 9/3241* (2013.01); *G06T 7/11* (2017.01); *G06T 7/194* (2017.01); *G06T 7/507* (2017.01); *G06T 2207/20132* (2013.01); *G06T 2207/30201* (2013.01)

(58) Field of Classification Search
CPC .. G06K 9/00248; G06K 9/3241; G06T 7/507; G06T 7/194; G06T 7/11; G06T 2207/20132; G06T 2207/30201; G06T 15/60; G06T 5/50; H04N 5/23229
See application file for complete search history.

(56) References Cited

U.S. PATENT DOCUMENTS

| | | | | |
|---|---|---|---|---|
| 7,940,964 | B2 * | 5/2011 | Kobayashi | ......... G06K 9/00228 358/461 |
| 9,900,523 | B2 | 2/2018 | Sato | |

(Continued)

FOREIGN PATENT DOCUMENTS

| | | |
|---|---|---|
| CN | 104574495 A | 4/2015 |
| CN | 105827947 A | 8/2016 |

(Continued)

OTHER PUBLICATIONS

Chinese Office Action (and English language translation thereof) dated May 8, 2020 issued in Chinese Application No. 201811165909.7.

*Primary Examiner* — Neil R McLean
(74) *Attorney, Agent, or Firm* — Holtz, Holtz & Volek PC

(57) ABSTRACT

An imaging apparatus 1 includes an image acquisition unit 51 and an image processing unit 53. The image acquisition unit 51 acquires a face image. The image processing unit 53 acquires a face image which has been acquired by the acquisition unit 51 and has been adjusted by at least one type of adjustment and synthesizes a plurality of face images including the adjusted face image, using map data in which a predetermined region of a face has been set as a transparent region on the basis of a three-dimensional shape of the face.

11 Claims, 7 Drawing Sheets

(56) References Cited

U.S. PATENT DOCUMENTS

| | | | | |
|---|---|---|---|---|
| 2007/0041640 A1* | 2/2007 | Tabata | ............... | G06T 5/008 |
| | | | | 382/173 |
| 2013/0314410 A1* | 11/2013 | Gravois | ............... | G06T 19/006 |
| | | | | 345/420 |
| 2015/0235372 A1* | 8/2015 | Smolyanskiy | ............... | G06T 17/00 |
| | | | | 345/420 |
| 2017/0085785 A1* | 3/2017 | Corcoran | ............... | G06K 9/00228 |

FOREIGN PATENT DOCUMENTS

| | | | | | |
|---|---|---|---|---|---|
| GB | 2543893 A | * | 5/2017 | ......... | G06K 9/00255 |
| JP | 2007193729 A | | 8/2007 | | |

* cited by examiner

FIG. 2
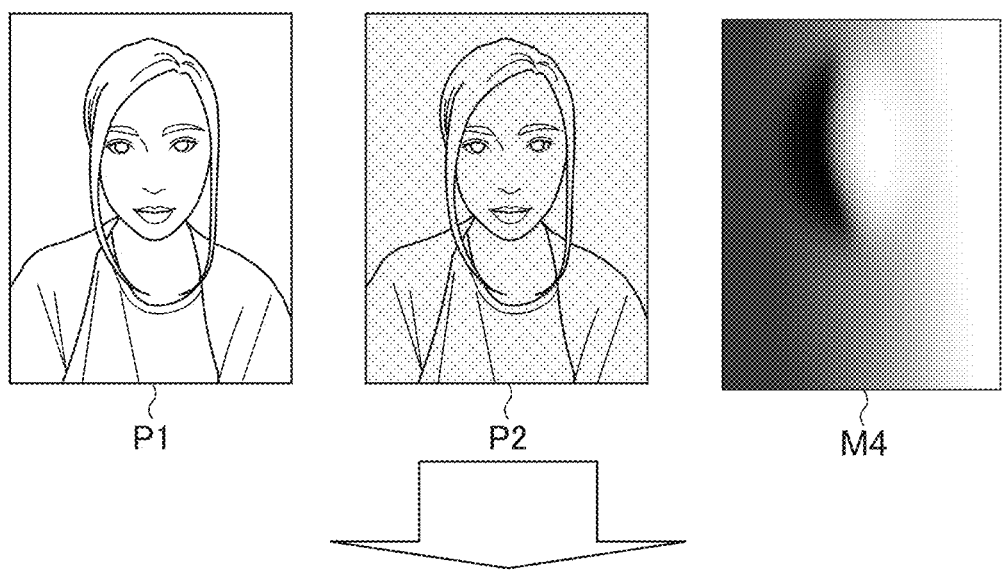
P1  P2  M4
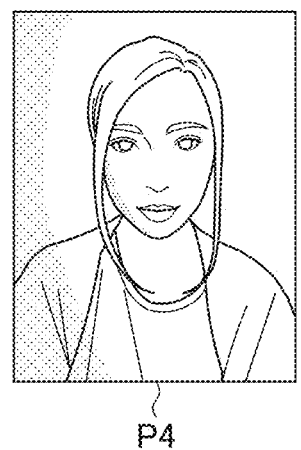
P4

IMAGE PROCESSING APPARATUS, IMAGE PROCESSING METHOD, AND RECORDING MEDIUM

CROSS-REFERENCE TO RELATED APPLICATIONS

This application is based upon and claims the benefit of priority under 35 USC 119 of Japanese Patent Application No. 2017-195426 filed on Oct. 5, 2017 the entire disclosure of which, including the description, claims, drawings, and abstract, is incorporated herein by reference in its entirety.

BACKGROUND OF THE INVENTION

Field of the Invention

The present invention relates to an image processing apparatus, an image processing method, and a recording medium.

Description of the Invention

Conventionally, a process that corrects the face of a person included in an image has been used. For example, JP 2007-193729 A discloses a technique that brightens pixels around the ridge of the nose of the face and darkens pixels around a region from the corners of the eyes to the wings of the nose in order to enhance the three-dimensional effect of the face in the printing of the face of a person.

One aspect of the present invention is an image processing apparatus comprising: a processor, wherein the processor is configured to acquire a face image; acquire a face image which has been acquired and has been adjusted by at least one type of adjustment method; and synthesize a plurality of face images including the adjusted face image, using map data in which a predetermined region of a face has been set as a transparent region on the basis of a three-dimensional shape of the face.

BRIEF DESCRIPTION OF THE DRAWINGS

FIG. 2 is a diagram schematically illustrating the generation of a shade-enhanced image in this embodiment.

DETAILED DESCRIPTION OF THE PREFERRED EMBODIMENTS

Hereinafter, an embodiment of the invention will be described with reference to the drawings.

Figure 1:
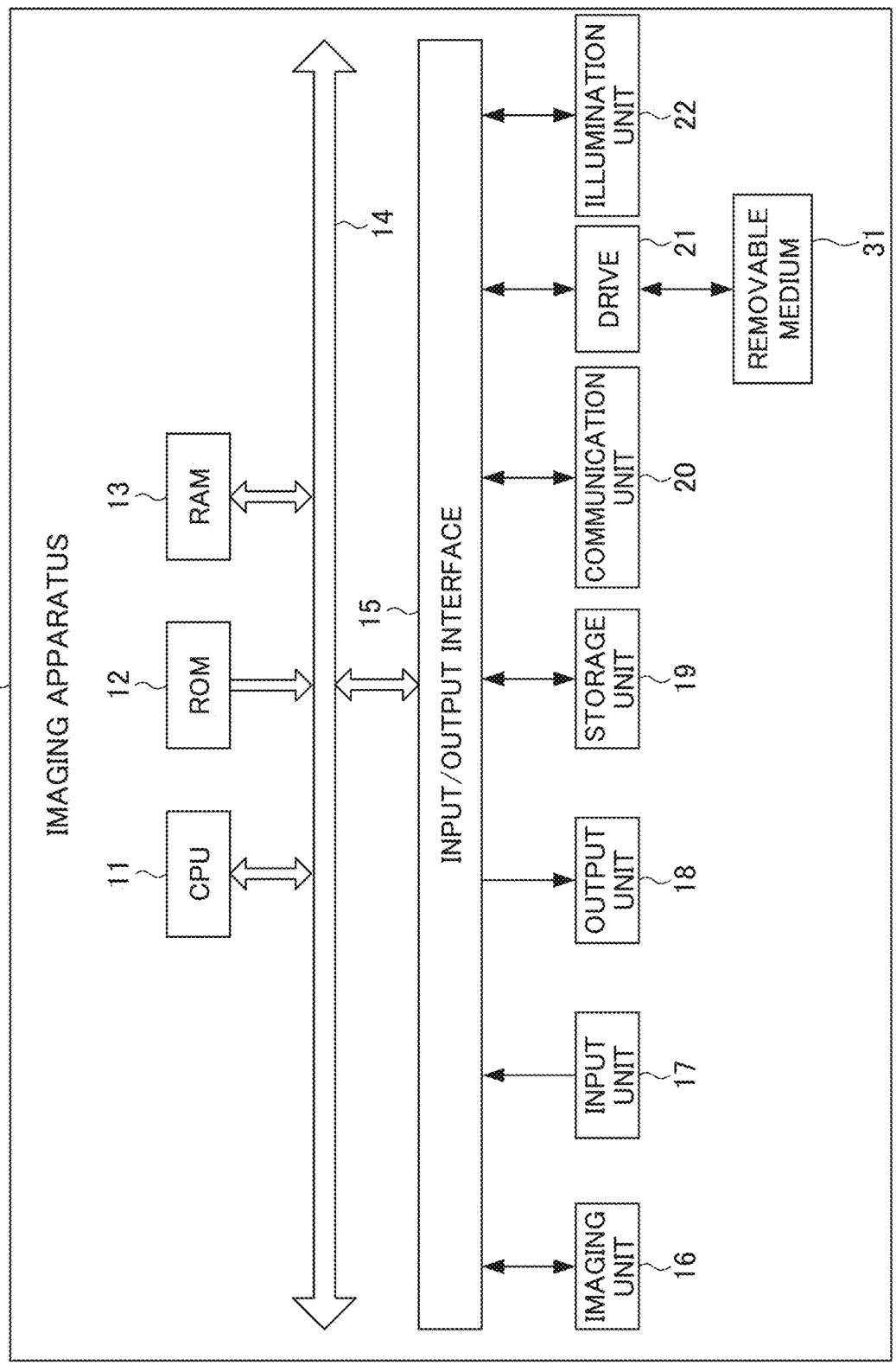
FIG. 1 is a block diagram illustrating the hardware configuration of an imaging apparatus according to an embodiment of an image processing apparatus of the invention.

FIG. 1 is a block diagram illustrating the hardware configuration of an imaging apparatus 1 according to an embodiment of an image processing apparatus of the invention. The imaging apparatus 1 is configured as, for example, a digital camera.

As shown in FIG. 1, the imaging apparatus 1 includes a CPU (Central Processing Unit) 11 serving as a processor, a ROM (Read Only Memory) 12, a RAM (Random Access Memory) 13, a bus 14, an input and output interface 15, an image capture unit 16, an input unit 17, an output unit 18, a storage unit 19, a communication unit 20, a drive 21, and an illumination unit 22.

The CPU 11 executes various processes according to a program recorded in the ROM 12 or a program loaded from the storage unit 19 into the RAM 13.

The RAM 13 also stores data and the like necessary for the CPU 11 to execute various processes as appropriate.

The CPU 11, the ROM 12, and the RAM 13 are mutually connected via the bus 14.

The input and output interface 15 is also connected to the bus 14. The input and output interface 15 is also connected to the image capture unit 16, the input unit 17, the output unit 18, the storage unit 19, the communication unit 20, the drive 21, and the illumination unit 22.

Although not shown, the image capture unit 16 includes an optical lens unit and an image sensor.

The optical lens unit is composed of a lens that collects light, for example, a focus lens, a zoom lens, etc., in order to photograph a subject.

The focus lens is a lens that forms a subject image on the light receiving surface of the image sensor.

The zoom lens is a lens that freely changes the focal length within a certain range.

A peripheral circuit for adjusting setting parameters such as focus, exposure, white balance and the like is provided in the optical lens unit as necessary.

The image sensor is composed of a photoelectric conversion element, an AFE (Analog Front End) and the like.

The photoelectric conversion element i,s composed of, for example, a CMOS (Complementary Metal Oxide Semiconductor) type photoelectric conversion element or the like.

A subject image is incident on the photoelectric conversion element from the optical lens unit.

Therefore, the photoelectric conversion element photoelectrically converts (capture) the subject image, accumulates an image signal for a certain period of time, and sequentially supplies the accumulated image signal to the AFE as an analog signal.

The AFE executes various signal processing such as A/D (Analog/Digital) conversion processing and the like on the analog image signal. A digital signal is generated by various kinds of signal processing and output as an output signal of the image capture unit 16.

Such an output signal of the image capture unit 16 is hereinafter referred to as "captured image data".

Data of the captured image is appropriately supplied to the CPU 11, an image processing unit (not shown), and the like.

The input unit 17 is composed of various buttons and the like, and inputs various information according to an instruction operation by a user.

The output unit 18 includes a display, a speaker, and the like, and outputs images and sounds.

The storage unit 19 is made of a DRAM (Dynamic Random Access Memory) and the like, and stores data of various images.

The communication unit 20 controls communication with other apparatuses (not illustrated) through a network including the Internet.

A removable medium 31 formed of a magnetic disk, an optical disk, a magnetooptical disk, a semiconductor memory, or the like, is suitably mounted on a drive 21.

A program read out from the removable medium 31 by the drive 21, is installed in a storage unit 19, as necessary.

In addition, the removable medium 31 is also capable of recording various data items such as data of an image recorded in the storage unit 109, as with the storage unit 109.

The illumination unit 22 includes eight LEDs (light emitting members) that are provided around the imaging unit 16 in a circular shape and one LED that is provided at a position separated from the eight LEDs in the imaging apparatus 1.

These LEDs selectively emit light according to an operation of the user in a case in which a live view image is captured or in a case in which an image is recorded. As such, the arrival direction of beams for illumination is changed and the image of the face is captured. Therefore, it is possible to acquire a face image whose shade has been artificially controlled.

As such, the lighting direction is changed and the image of the face is captured. Therefore, it is possible to acquire a face image whose shadow has been artificially controlled.

The imaging apparatus 1 having the above-mentioned configuration has a function that prepares an image for highlight which has been captured in an extended dynamic range (luminance range) and an image for shadow which has been captured without extending the dynamic range and has been gamma-corrected, performs α blending for the image for highlight and the image for shadow with a mask image (shadow mask image) for enhancing shade to generate an image (hereinafter, referred to as a "shade-enhanced image") in which the three-dimensional effect of the face has been appropriately corrected. In this case, in the shadow mask image, the gradation of the shadow of the periphery of the face is different from the gradation of the shadow of the background, which makes it possible to generate an appropriate shade-enhanced image.

FIG. 2 is a diagram schematically illustrating the generation of the shade-enhanced image P4 in this embodiment. In a case in which the shade-enhanced image P4 according to this embodiment is generated, as illustrated in FIG. 2, an image P1 for highlight which has been captured in an extended dynamic range and an image P2 for shadow which has been captured without extending the dynamic range and has been gamma-corrected are generated. In a case in which the image P2 for shadow is generated, as a difference in brightness (luminance) between a face region of the image P1 for highlight and a face region of the image P2 for shadow becomes smaller, the intensity of gamma correction is set to a higher brightness. In addition, a gradation mask image for a face and a gradation mask image for a background are synthesized on the basis of a face mask image indicating a face region to generate a shadow mask image for enhancing shade, which will be described below. In this embodiment, in the shadow mask image, the gradation of the periphery of the face and the gradation of the background are different from each other. Therefore, it is possible to improve the shade enhancement effect of the face and to enhance a natural shadow. Then, the image for highlight and the image for shadow are synthesized by a blending using the shadow mask image to generate a shade-enhanced image P4 in which the three-dimensional effect of the face has been appropriately corrected. Each pixel value of the shadow mask image is an α value of each corresponding pixel in a case in which images are synthesized by a blending.

[Creation of Shadow Mask Image]

Figure 3:
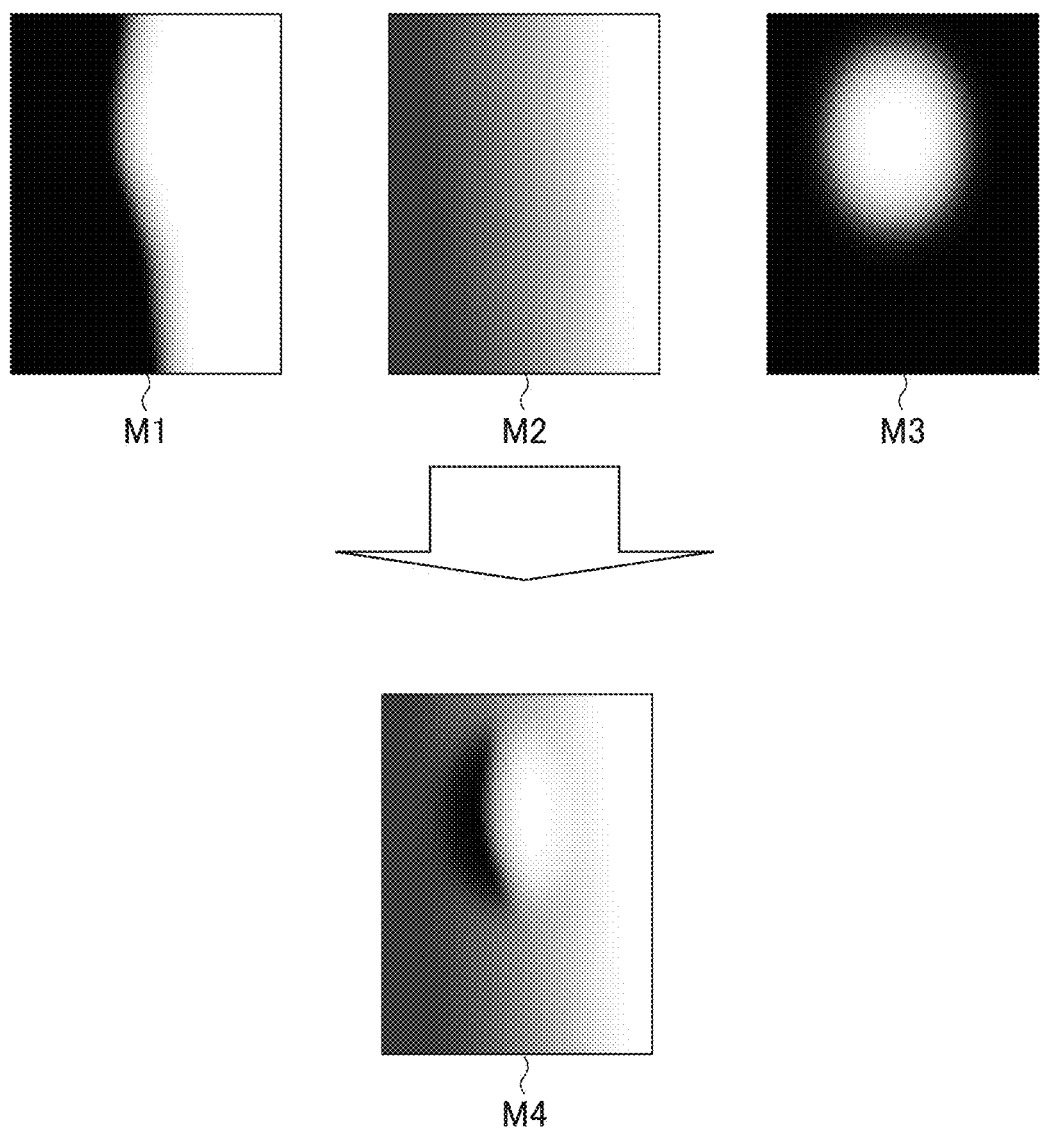
FIG. 3 is a diagram schematically illustrating the creation of a shadow mask image.

FIG. 3 is a diagram schematically illustrating the creation of the shadow mask image.

A shadow mask image M4 is created by performing α blending for a gradation mask image M1 for a face and a gradation mask image M2 for a background, using a face mask image M3 indicating a face region as the α value.

[Creation of Gradation Mask Image for Face]

Figure 4A:
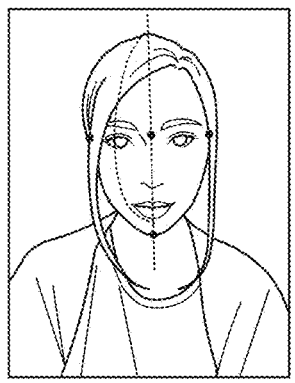
FIG. 4A is a diagram illustrating an image for highlight.
Figure 4B:
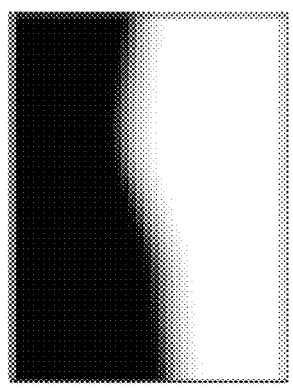
FIG. 4B is a diagram illustrating a gradation mask image for a face (base image).
Figure 4C:
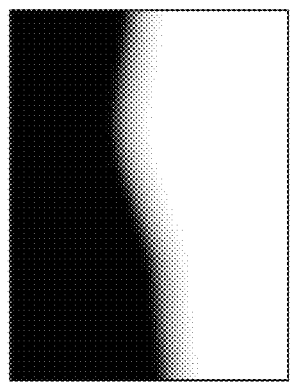
FIG. 4C is a diagram illustrating the gradation mask image for a face (after a smoothing process).

FIGS. 4A to 4C are diagrams schematically illustrating the creation of the gradation mask image for a face. In a case in which the gradation mask image for a face is created, first, the contour information of the face is detected in the image for highlight (FIG. 4A). Here, the center line of the face connecting a point between both eyes and a point of the chin and contour points of the face located outside both eyes are detected as the contour information of the face. Then, the angle and width of a gradation for a face are determined on the basis of the detected contour information of the face and a base image (FIG. 4B) of the gradation mask image for a face is created. In addition, a smoothing process is performed for the base image of the gradation mask image for a face with a bilateral filter. As a result of the smoothing process, the gradation mask for a face (FIG. 4C) is created.

[Creation of Gradation Mask image for Background]

Figure 5A:
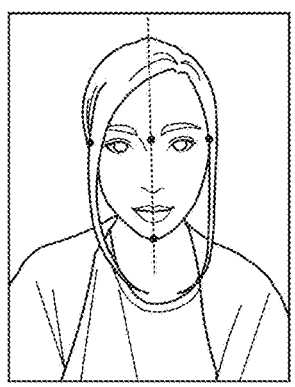
FIG. 5A is a diagram illustrating the image for highlight.
Figure 5B:
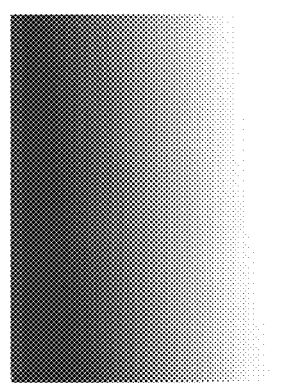
FIG. 5B is a diagram illustrating a gradation mask image for a background (base image).
Figure 5C:
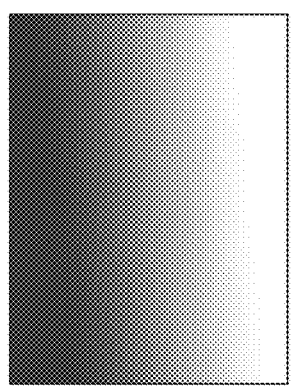
FIG. 5C is a diagram illustrating the gradation mask image for a background (after the smoothing process).

FIGS. 5A to 5C are diagrams schematically illustrating the creation of the gradation mask image for a background. In a case in which the gradation mask image for a background is created, first, the contour information of the face is detected in the image for highlight (FIG. 5A). Here, the center line of the face connecting a point between both eyes and a point of the chin is detected as the contour information of the face. Then, the angle and width of a gradation for a background are determined on the basis of the detected contour information of the face and a base image (FIG. 5B) of the gradation mask image for a background is created. In addition, the smoothing process is performed for the base image of the gradation mask image for a background with the bilateral filter. As a result of the smoothing process, the gradation mask image for a background (FIG. 5C) is created.

[Creation of Face Mask Image]

Figure 6:
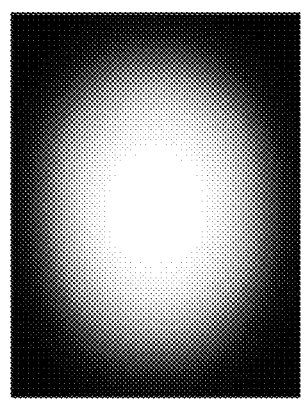
FIG. 6 is a diagram schematically illustrating a base image of a face mask image.

The face mask image used to create the shadow mask image is created by processing the base image of the face mask image that has been stored in advance according to the state of the face in the captured image. FIG. 6 is a diagram schematically illustrating the base image of the face mask image. In a case in which the face mask image is created, first, face detection is performed for the captured image. Then, the vertical and horizontal orientation of the gradation (blurred portion) is determined according to the orientation of the detected face. In addition, the size of the gradations (blurred portion) is changed depending on the size of the detected face. Then, the gradation (blurred portion) whose size has been changed is arranged according to the position of the face detected by the face detection. As a result, the face mask image is created.

Figure 7:
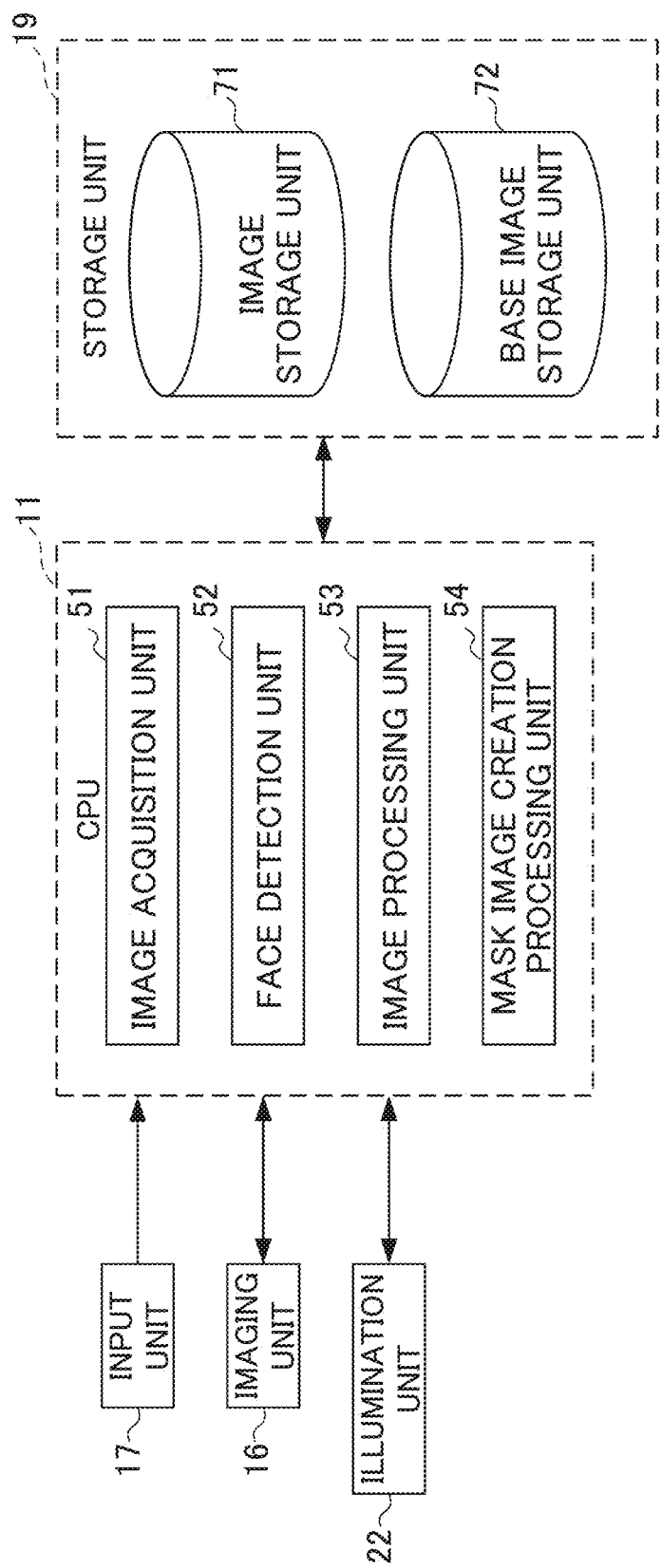
FIG. 7 is a functional block diagram illustrating a functional configuration for performing a shade-enhanced image generation process among the functional configurations of the imaging apparatus illustrated in FIG. 1.

FIG. 7 is a functional block diagram illustrating a functional configuration for performing a shade-enhanced image generation process among the functional configurations of the imaging apparatus 1 illustrated in FIG. 1. The shade-enhanced image generation process is a series of processes which performs α blending for the image for highlight which has been captured in an extended dynamic range and the image for shadow which has been captured without extending the dynamic range and has been gamma-corrected, using the shadow mask image for enhancing shade, to generate a shade-enhanced image in which the three-dimensional effect of the face has been appropriately corrected.

In a case in which the shade-enhanced image generation process is performed, an image acquisition unit 51, a face detection unit 52, an image processing unit 53, and a mask image creation processing unit 54 function in the CPU 11 as illustrated in FIG. 7.

In addition, an image storage unit 71 and a base image storage unit 72 are set in a region of the storage unit 19.

The data of the image output from the imaging unit 16 is stored in the image storage unit 71. The data of the base image of the face mask image is stored in the base image storage unit 72.

The image acquisition unit 51 acquires the data of the captured image obtained by performing a development process for the image captured by the imaging unit 16 or the data of the image to be processed from the image storage unit 71. In this embodiment, the image acquisition unit 51 acquires an image (image for highlight) captured in an extended dynamic range and an image captured without extending the dynamic range.

The face detection unit 52 detects a face from the image and detects each organ forming the face in the detected face. In addition, the face detection unit 52 acquires the contour information of the face including the center line of the face connecting a point between both eyes and a point of the chin and the contour points of the face located outside both eyes. In a case in which the face and each organ are detected, the existing face detection technique and the existing organ detection technique can be used.

The image processing unit 53 performs various types of image processing related to the generation of the shade-enhanced image. Specifically, the image processing unit 53 performs a gamma correction process for the image captured without extending the dynamic range. In this case, the image processing unit 53 sets the intensity of gamma correction so as to become higher as a difference in brightness (luminance) between a face region of the image for highlight and a face region of the image for shadow becomes smaller and then performs the gamma correction process. In addition, the image processing unit 53 synthesizes the image for highlight and the image for shadow on the basis of the shadow mask image, using α blending. As a result, a shade-enhanced image is created. Furthermore, the image processing unit 53 may mainly perform a whitening process of correcting three elements, that is, a reduction in saturation, an increase in brightness, and the rotation of hue in a blue direction. The image processing unit 53 may perform a skin beautifying process of performing correction for smoothing the skin with a bilateral filter (or other smoothing filters).

The mask image creation processing unit 54 creates the gradation mask image for a face. Specifically, the mask image creation processing unit 54 determines the angle and width of the gradation for a face according to the contour information (the center line of the face connecting a point between both eyes and a point of the chin and the contour points of the face located outside both eyes) of the face detected in the image for highlight and creates the base image of the gradation mask image for a face. Then, the mask image creation processing unit 54 performs the smoothing process for the base image of the gradation mask image for a face with the bilateral filter to create the gradation mask image for a face. In addition, the mask image creation processing unit 54 creates the gradation mask image fore background. Specifically, the mask image creation processing unit 54 determines the angle and width of the gradation for a background according to the contour information (the center line of the face connecting a point between both eyes and a point of the chin) of the face detected in the image for highlight and creates the base image of the gradation mask image for a background. Then, the mask image creation processing unit 54 performs the smoothing process for the base image of the gradation mask image for a background with the bilateral filter to create the gradation mask image for a background. In addition, the mask image creation processing unit 54 creates the face mask image. Specifically, the mask image creation processing unit 54 determines the vertical and horizontal orientation of the gradation (blurred portion) according to the orientation of the face in the captured image. In addition, the mask image creation processing unit 54 changes the size of the gradation (blurred portion) depending on the size of the detected face. Then, the mask image creation processing unit 54 arranges the gradation (blurred portion) whose size has been changed according to the position of the face detected by the face detection to create the face mask image. In addition, the mask image creation processing unit 54 performs α blending for the gradation mask image for a face and the gradation mask image for a background, using the face mask image indicating a face region as the α value, to create the shadow mask image.

Figure 8:
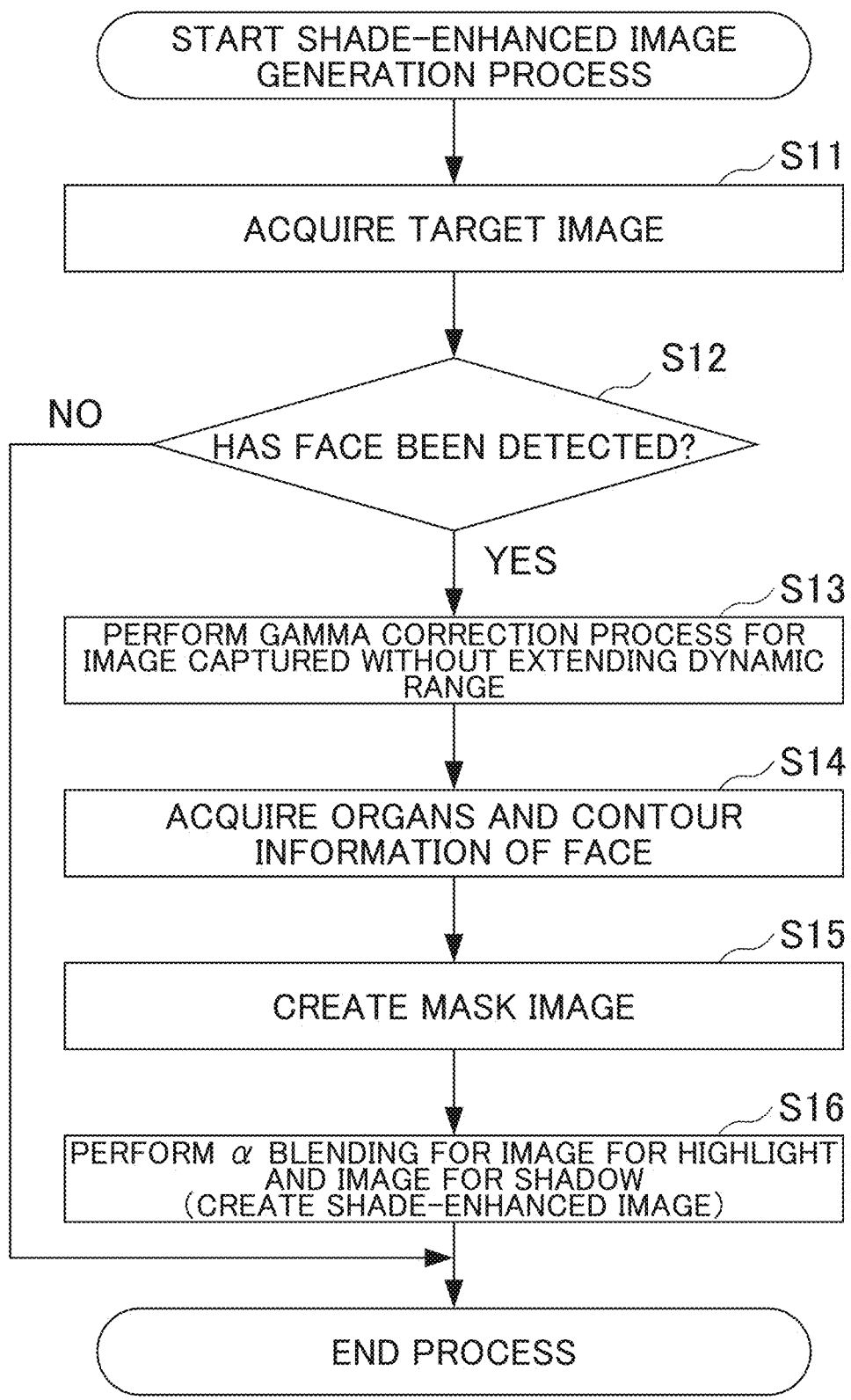
FIG. 8 is a flowchart illustrating the flow of the shade-enhanced image generation process performed by the imaging apparatus illustrated in FIG. 1 which has the functional configuration illustrated in FIG. 7.

FIG. 8 is a flowchart illustrating the flow of the shade-enhanced image generation process performed by the imaging apparatus 1 illustrated in FIG. 1 which has the functional configuration illustrated in FIG. 7. The shade-enhanced image generation process starts in response to an operation of starting the shade-enhanced image generation process which has been input to the input unit 17 by the user. The operation of starting the shade-enhanced image generation process can be an imaging instruction operation. A development process can be performed for the image captured by the imaging unit 16 in response to the imaging instruction operation and then the shade-enhanced image generation process can be performed.

The image acquisition unit 51 acquires the data of a captured image obtained by performing the development process for the image captured by the imaging unit 16 or the data of the image to be processed from the image storage unit 71 (Step S11). In this case, the image acquisition unit 51 acquires the image (image for highlight) captured in an extended dynamic range and the image captured without extending the dynamic range.

The face detection unit 52 performs face detection for the image to be processed and determines whether a face has been detected (Step S12). In a case in which no faces have been detected, the shade-enhanced image generation process ends (Step S12: NO). In a case in which a face has been detected, the process proceeds to Step S13 (Step S12: YES).

The image processing unit 53 performs the gamma correction process for the image captured without extending the dynamic range (Step S13). In this case, the image processing unit 53 sets the intensity of gamma correction so as to become higher as a difference in brightness (luminance) between a face region of the image for highlight and a face region of the image for shadow becomes smaller and then performs the gamma correction process. The face detection unit 52 acquires each organ forming the face and the contour information of the face (for example, the center line of the face connecting a point between both eyes and a point of the chin and the contour points of the face located outside both eyes) in the detected face (Step S14).

The mask image creation processing unit 54 creates the mask images (the gradation mask image for a face, the gradation mask image for a background, the face mask image, and the shadow mask image) used in the shade-enhanced image generation process (Step S15).

The image processing unit 53 synthesizes the image for highlight and the image for shadow on the basis of the shadow mask image, using α blending (Step S16). As a result, the shade-enhanced image in which the three-dimensional effect of the face has been appropriately corrected is generated. Then, the shade-enhanced image generation process ends.

MODIFICATION EXAMPLE 1

Figure 9:
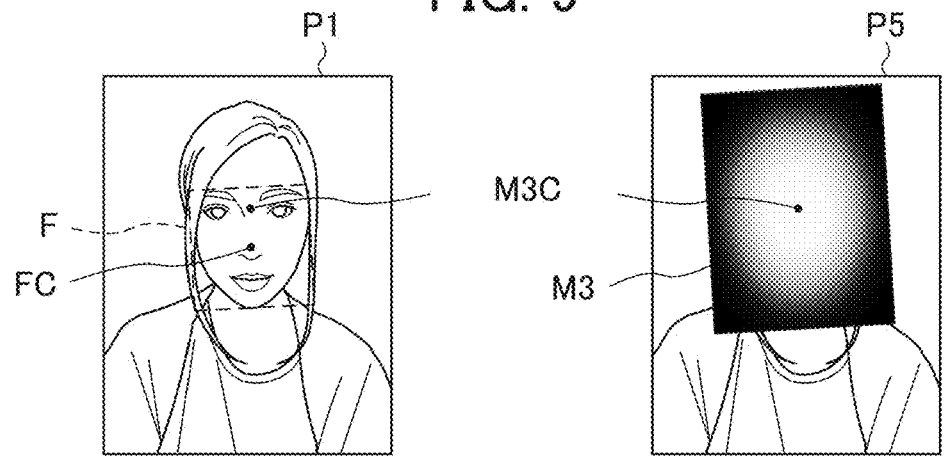
FIG. 9 is a diagram schematically illustrating the creation of a face mask image in Modification Example 1.

In the above-described embodiment, in a case in which the face mask image is created, the position and size of the gradation (blurred portion) may be determined as follows. FIG. 9 is a diagram schematically illustrating the creation of a face mask image in Modification Example 1. In Modification Example 1, in a case in which a face mask image is created, the coordinates M3C of the center of the face mask image are set at a position corresponding to a predetermined proportion (for example, 40%) to the height of a face detection frame in a direction from the center FC of the face detection frame to the head. In addition, the size of a face mask image M3 is set to be twice the size of a face detection frame F (for example, twice in the vertical direction). The face mask image M3 whose center coordinates and size have been set in the total angle of view of the captured image is created. The mask image can be used to generate the shadow mask image illustrated in FIG. 3. In this case, it is possible to more simply create a face mask image, using the face detection frame acquired by the face detection.

MODIFICATION EXAMPLE 2

Figure 10A:
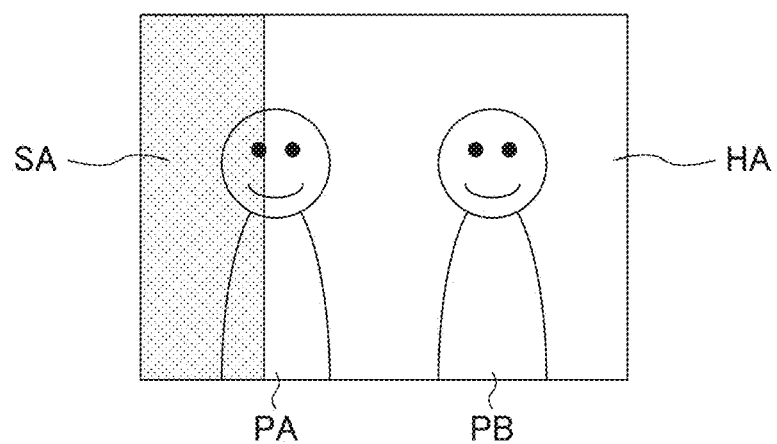
FIG. 10A is a diagram schematically illustrating a gradation mask image setting method in a case in which a left person is shadowed in an image including a plurality of persons.
Figure 10B:
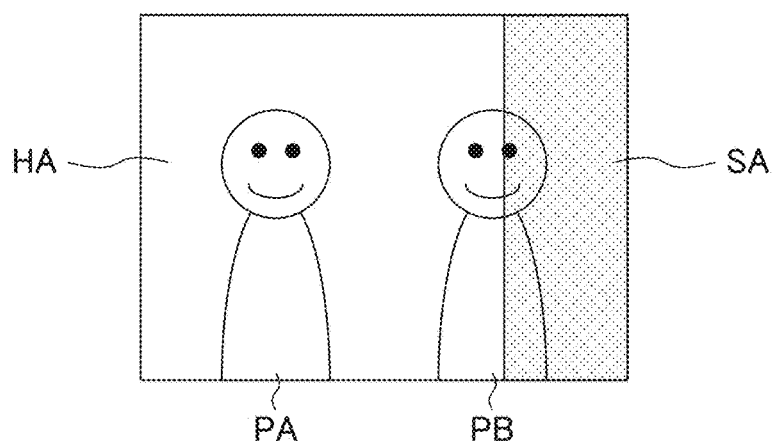
FIG. 10B is a diagram schematically illustrating a gradation mask image setting method in a case in which a right person is shadowed in the image including a plurality of persons.

In the above-described embodiment, in a case in which a plurality of persons are included in the captured image, the width of the gradation for a background may be determined such that a person is prevented from being included in a shadow region of the gradation mask image for a background. FIG. 10A is a diagram schematically illustrating a gradation mask image setting method in a case in which a plurality of persons are included in a captured image and illustrates a case in which a left person A is shadowed. FIG. 10B is a diagram schematically illustrating a gradation mask image setting method in a case in which a plurality of persons are included in a captured image and illustrates a case in which a right person B is shadowed. As illustrated in FIGS. 10A and 10B, in this modification example, the shade-enhanced image generation process is performed for the shadowed person and the gradation image for a background is created such that a person who is not shadowed is included in a highlight region of the gradation mask image for a background. Therefore, it is possible to prevent the entire person who is an object from being corrected to a dark image.

The imaging apparatus 1 having the above-mentioned configuration includes the image acquisition unit 51 and the image processing unit 53. The image acquisition unit 51 acquires a face image. The image processing unit 53 adjusts the dynamic range of the face image acquired by the image acquisition unit 51. The image processing unit 53 synthesizes a plurality of face images including the adjusted face image, using map data (mask image) in which a predetermined region of the face has been set as a transparent region (an image synthesized by, for example, α blending) on the basis of the three-dimensional shape of the face. Therefore, the imaging apparatus 1 can generate an image (shade-enhanced image) in which the three-dimensional effect of the face has been appropriately corrected.

In the map data, a face peripheral region including the face has been set as the transparent region on the basis of a lighting direction. Therefore, the imaging apparatus 1 can generate an image in which the shadow of the face has been enhanced by lighting in a predetermined direction.

In addition, in the map data, a transparent region has been set in a gradation shape in a background region other than a predetermined region of the face on the basis of the lighting direction. Therefore, the imaging apparatus 1 can generate an image in which the shadow of the face has been enhanced by lighting in a predetermined direction.

The adjustment method includes adjusting the luminance range of the face image. Therefore, the imaging apparatus 1 can generate an image in which the shadow of the face has been enhanced.

The adjustment method includes gamma correction for the face image. Therefore, the imaging apparatus 1 can generate an image in which the shadow of the face has been enhanced.

In addition, the imaging apparatus 1 designates a region whose brightness is changed depending on the lighting direction in the face image. Therefore, it is possible to enhance the shadow of the face image considering the lighting direction.

Furthermore, the present invention is not limited to the embodiments described above, and modifications, improvements, and the like within a range where the object of the present invention can be attained, are included in the present invention.

In the above-described embodiment, the shade-enhanced image is generated using the image for highlight captured in an extended dynamic range and the image for shadow which has been captured without extending the dynamic range and has been gamma-corrected. However, the invention is not limited thereto. For example, the shade-enhanced image may be generated using an image subjected to correction for increasing the brightness of the image captured without extending the dynamic range and an image subjected to correction for decreasing the brightness of the image captured without extending the dynamic range.

In the above-described embodiment, the content of the shadow mask image can be changed to various forms as long as the shadow mask image creates the effect of enhancing the shadow.

In the above-described embodiment, a digital camera has been described as an example of the imaging apparatus 1 to which the invention is applied. However, the invention is not particularly limited thereto. For example, the invention can be generally applied to electronic apparatuses with an image processing function. Specifically, for example, the invention can be applied to a notebook personal computer, a printer, a television receiver, a video camera, a portable navigation device, a mobile phone, a smart phone, and a portable game machine.

The processing sequence described above can be executed by hardware, and can also be executed by software. In other words, the hardware configuration of FIG. 3 is merely illustrative examples, and the present, invention is not particularly limited thereto. More specifically, the types of functional blocks employed to realize the above-described functions are not particularly limited to the examples shown in FIG. 3, so long as the mobile terminal 2 can be provided with the functions enabling the aforementioned processing sequence to be executed in its entirety. A single functional block may be constituted by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 113 of FIG. 2 distributed separately from the device main body for supplying the program to a user, but also can be constituted by a storage medium or the like supplied to the user in a state incorporated in the device main body in advance. The removable medium 113 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded, and a hard disk included in the storage unit 19 of FIG. 2, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising:
a processor,
wherein the processor is configured to:
acquire a first face image, which is an image of a face, and which has been captured in an adjusted luminance range;
acquire a second face image, which is an image of the same face as the face in the first face image, and which has been captured without adjusting the luminance range; and
synthesize the first face image and the second face image, using map data in which a predetermined region of the face has been set as a transparent region based on a three-dimensional shape of the face.

2. The image processing apparatus according to claim 1, wherein, in the map data, a face peripheral region including the face has been set as the transparent region based on a lighting direction.

3. The image processing apparatus according to claim 2, wherein the processor is configured to designate a region whose brightness is changed depending on the lighting direction in at least one of the first face image and the second face image.

4. The image processing apparatus according to claim 1, wherein, in the map data, the transparent region has been set in a gradation shape in a background region other than a predetermined region of the face based on a lighting direction.

5. The image processing apparatus according to claim 1, wherein the processor is configured to perform gamma correction on the second face image.

6. An image processing method which is performed by an image processing apparatus including a processor, the image processing method comprising:
acquiring a first face image, which is an image of a face, and which has been captured in an adjusted luminance range;
acquiring a second face image, which is an image of the same face as the face in the first face image, and which has been captured without adjusting the luminance range; and
synthesizing the first face image and the second face image, using map data in which a predetermined region of the face has been set as a transparent region based on a three-dimensional shape of the face.

7. The image processing method according to claim 6, wherein, in the map data, a face peripheral region including the face has been set as the transparent region based on a lighting direction.

8. The image processing method according to claim 6, wherein, in the map data, the transparent region has been set in a gradation shape in a background region other than a predetermined region of the face based on a lighting direction.

9. The image processing method according to claim 6, wherein gamma correction is performed on the second face image.

10. The image processing method according to claim 6, further comprising designating a region whose brightness is changed depending on the lighting direction in at least one of the first face image and the second face image.

11. A non-transitory computer-readable storage medium storing an image processing program, which is executed by an image processing apparatus including: a processor, the image processing program performing:
- a face image acquisition process of acquiring a first face image, which is an image of a face, and which has been captured in an adjusted luminance range;
- an adjusted image acquisition process of acquiring a second face image, which is an image of the same face as the face in the first face image, and which has been captured without adjusting the luminance range; and
- a synthesis process of synthesizing the first face image and the second face image, using map data in which a predetermined region of the face has been set as a transparent region based on a three-dimensional shape of the face.

* * * * *